United States Patent [19]

Kikuchi et al.

[11] Patent Number: 5,031,057
[45] Date of Patent: Jul. 9, 1991

[54] TAPE MOVING MECHANISM FOR AUTOMATIC TIME CASSETTE CHANGER

[75] Inventors: Takashi Kikuchi; Shigeo Aoyagi, both of Iwaki, Japan

[73] Assignee: Alps Electric Co., Ltd., Tokyo, Japan

[21] Appl. No.: 465,714

[22] Filed: Jan. 16, 1990

Related U.S. Application Data

[62] Division of Ser. No. 207,671, Jun. 16, 1988, Pat. No. 4,918,547, which is a division of Ser. No. 807,368, Dec. 10, 1985, Pat. No. 4,777,547.

[30] Foreign Application Priority Data

| Dec. 10, 1984 | [JP] | Japan | 59-186121 |
| Dec. 10, 1984 | [JP] | Japan | 59-186122 |
| Dec. 10, 1984 | [JP] | Japan | 59-186123 |
| Dec. 10, 1984 | [JP] | Japan | 59-186124 |
| Dec. 10, 1984 | [JP] | Japan | 59-186125 |

[51] Int. Cl.$^5$ ............................................. G11B 15/68
[52] U.S. Cl. ........................................ 360/92; 360/91
[58] Field of Search ................................. 360/92–94, 360/96.5, 91

[56] References Cited

U.S. PATENT DOCUMENTS

| 3,852,819 | 12/1974 | Staar | 360/92 |
| 4,075,669 | 2/1978 | Louzil et al. | 360/92 |
| 4,287,541 | 9/1981 | Tanahashi et al. | 360/92 |
| 4,438,468 | 3/1984 | Kamei et al. | 360/92 |

FOREIGN PATENT DOCUMENTS

| 56-80848 | 7/1981 | Japan | 360/92 |
| 59-146473 | 8/1984 | Japan | 360/92 |

Primary Examiner—John H. Wolff
Attorney, Agent, or Firm—Guy W. Shoup; David W. Heid

[57] ABSTRACT

A mechanism in an automatic tape cassette changer for engaging and moving tape cassettes from a tape cassette container to engage a tape cassette player/recorder. The mechanism comprising an engagement mechanism on a rail and a cam mechanism, where the engagement mechanism engages one of a plurality of tape cassettes in a tape cassette container and moves the tape cassette engaged along the rail to a second position where the cam mechanism causes the tape cassette engaged to move into a playing/recording position of a tape cassette player/recorder, the engagement mechanism then moves back along the rail to its initial position and remains there during the playing/recording of the tape cassette engaged with the tape cassette player/recorder. The mechanism provides for this series of steps to be performed in reverse when the tape cassette in the cassette tape player/recorder is to be moved back from the tape cassette player/recorder to the tape cassette container.

3 Claims, 6 Drawing Sheets

TAPE MOVING MECHANISM FOR AUTOMATIC TIME CASSETTE CHANGER

This application is a division of application Ser. No. 07/207,671, filed June 16, 1988, now U.S. Pat. No. 4,918,547, which was a division of application Ser. No. 06/807,368, filed Dec. 10, 1985, now U.S. Pat. No. 4,777,547.

BACKGROUND OF THE INVENTION

1. Field of the Invention

The present invention relates to an automatic changer for cassette tapes and more particularly to an automatic changer especially suited for the use in a car.

2. Description of the Prior Art

As an automatic changer for cassette tapes for domestic use such a type has so far been proposed that a plurality of cassette tapes are contained within a body, a desired cassette tape is selected therefrom responding to a control signal, and the selected cassette tape is loaded into a cassette tape recorder disposed in the body and a playback operation is performed thereby.

Recently, there has been a desire to mount such an automatic changer for cassette tapes on an automobile or the like. However, since the above mentioned domestic use auto changer is designed so as to be operated in a stationary state, the same has not been able to provide a stable operation under such special conditions to receive vibrations as in a car or the like.

SUMMARY OF THE INVENTION

The present invention has been made in view of the stated circumstances of the prior art. The principal object of the present invention is the provision of an automatic changer for cassette tapes which is suited for use in a car or the like.

To attain the object, the auto changer of the present invention has been made into such a structure that is provided with a tape container capable of containing a plurality of cassette tapes and a table for supporting the tape container, and a first engagement portion, for example, formed of a groove portion, is provided for the tape container extended in the direction orthogonal to the direction in which the cassette tape is inserted into the tape container, a second engagement portion, for example, formed of a protruded portion, engageable with the first engagement portion is provided for the table, the first engagement portion is positioned out of the center of the side plate of the tape container, which is disposed in parallel with the direction in which the cassette tape is inserted, for example, in the bottom of the tape container at the end portion on the side wherefrom the cassette tape is inserted, and the first engagement portion is adapted to be movable with reference to the second engagement portion.

To attain the object, the automatic changer of the present invention has also been arranged so that holes are provided in the side plates of the cassette container capable of containing a plurality of cassette tapes at the position corresponding to the hub of the cassette tape, cut portions are provided in partition walls, which provide receiving portions within the tape container, and a hub locking member, for example, made of a rod member, which is adapted to pass through the holes, cut portions, and the hubs for restraining rotation of the hubs.

To attain the object, the automatic changer of the present invention has also been arranged so that it has been provided with a tape container capable of containing a plurality of cassette tapes, a rail extending from where the tape container is disposed to where the cassette tape recorder is disposed, a slider adapted to be slidably engaged with the rail and having protrusions engageable with a cassette tape contained in the tape container, and slider driving means for driving the slider.

To attain the object, the automatic changer of the present invention has also been made into a structure having a tape container capable of containing a plurality of cassette tapes, a table for movably supporting the tape container, and controlling members for controlling movement of the tape container in the direction in which a cassette tape contained in the tape container is fed out and up-and-down movement of the tape container in the direction orthogonal to the direction of the above feeding out.

To attain the object, the automatic changer of the present invention has further been made into a structure having a tape container capable of containing a plurality of cassette tapes, a body provided with a side plate with an opening provided therein through which the tape container is adapted to be inserted, a door capable of opening and shutting the opening, and door driving mechanism, for example, made of a gear mechanism, for opening and shutting the door.

DESCRIPTION OF THE PREFERRED EMBODIMENT

An automatic cassette tape changer of a preferred embodiment of the present invention will be described with reference to accompanying drawings in the following.

Figure 1A:
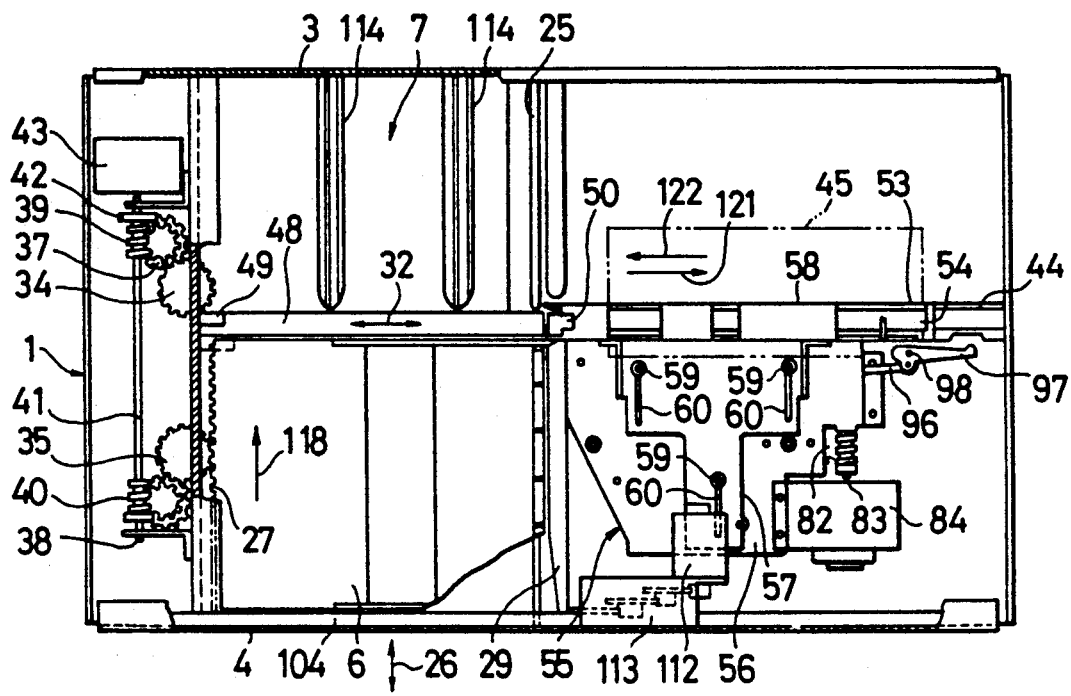
FIG. 1 (a) and (b) are drawings for showing a preferred embodiment of the present invention, in which FIG. 1 (a) is a plan view with the upper portion broken away and FIG. 1 (b) is a side view.
Figure 1B:
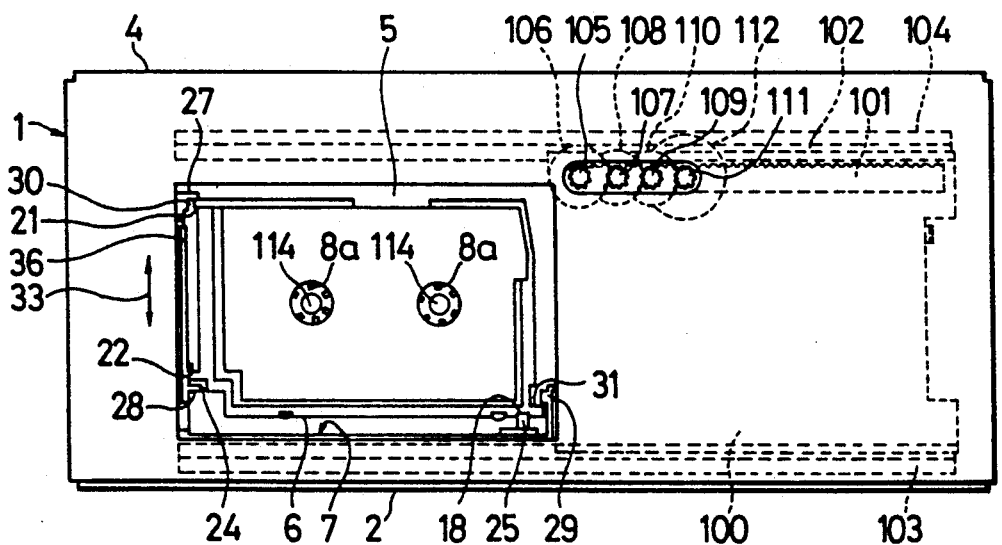

FIG. 1 (a) and (b) are drawings for explaining a preferred embodiment of the present invention, in which FIG. 1 (a) is a plan view with the upper portion broken away and FIG. 1 (b) is a side view.

Referring to the drawings, 1 denotes a case which forms a body, 2 denotes a bottom plate forming the bottom portion of the case 1, and 3 and 4 denote side plates forming side portions of the case 1, in which the side plate 4 is provided therein with an opening 5. Denoted by 6 is a tape container which is adapted to be inserted in the case 1 through the opening 5 and supported on a table 7 disposed on the bottom plate 2 of the case 1.

Figure 2A:
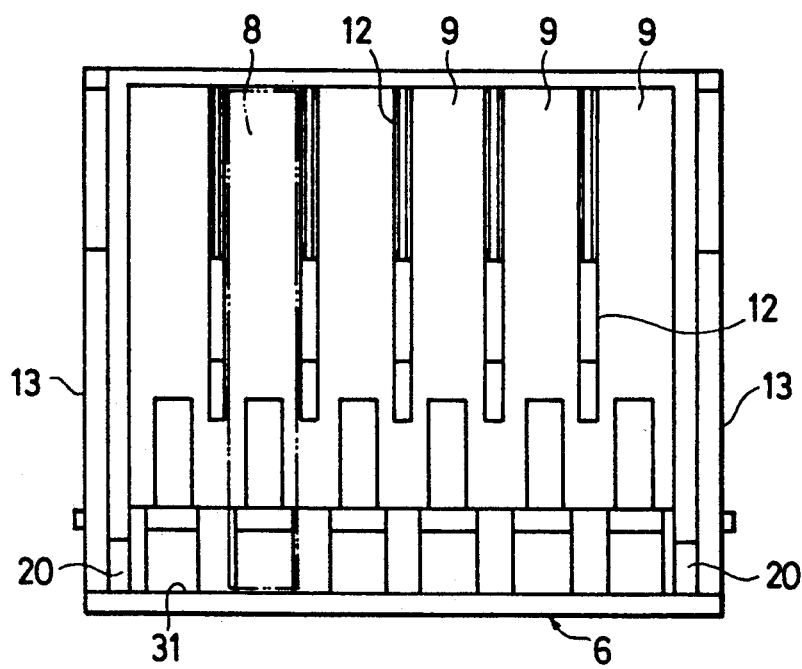
FIG. 2 (a), (b), and (c) are enlarged views of a tape container provided in the preferred embodiment as shown in FIG. 1 (a) and (b), in which FIG. 2 (a) is a front view, FIG. 2 (b) is a side view, and FIG. 2 (c) is a rear view.
Figure 2B:
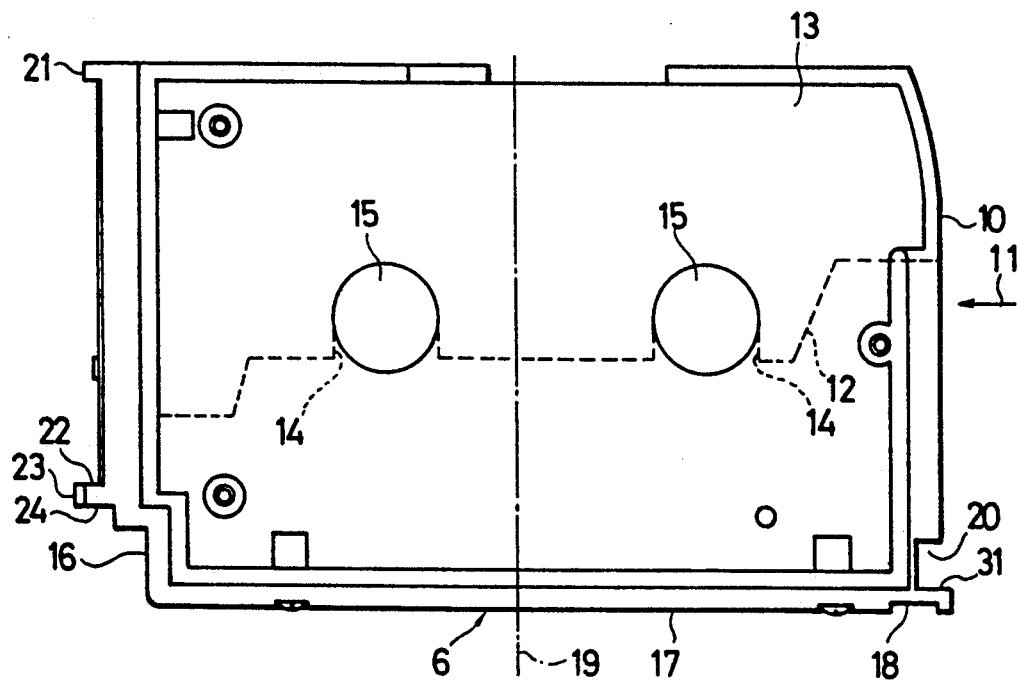
Figure 2C:
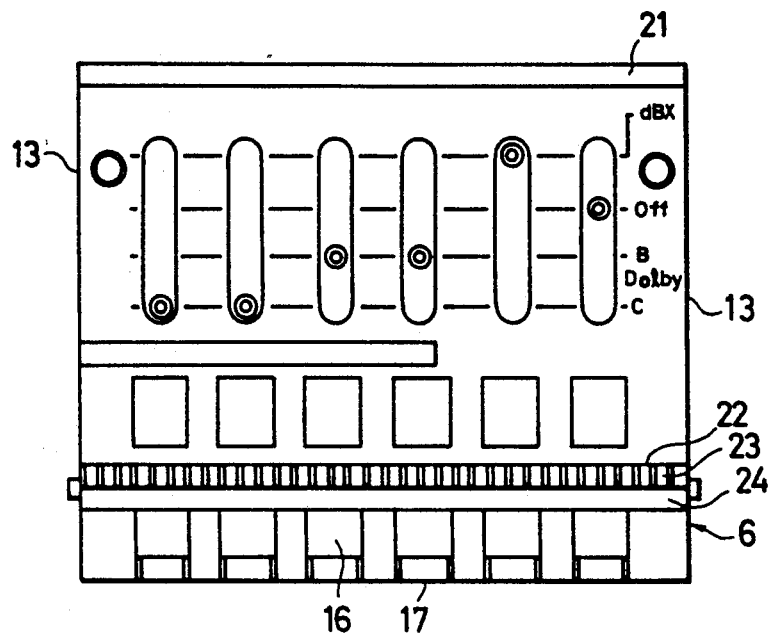

Structure of the tape container 6 is as shown in FIG. 2 (a), (b), and (c), wherein FIG. 2 (a) is a front view, FIG. 2 (b) is a side view, and FIG. 2 (c) is a rear view. The tape container 6 is provided, as shown in FIG. 2 (a), with receiving portions 9 capable of receiving a plurality of cassette tapes 8, for example, six cassette tapes 8, and a cassette tape 8 is adapted to be inserted into the tape container 6 through a tape receiving opening 10 in the direction indicated by the arrow 11 as shown in FIG. 2 (b). Denoted by 12 are partition walls forming the receiving portions 9, and 13 are side faces each disposed in parallel with the receiving direction of the cassette tape 8 indicated by the arrow 11. As indicated in FIG. 2 (b), the partition walls 12 are provided with semicircular cut portions 14 at their upper portions, and the side faces 13 are provided therein with circular holes 15 which correspond to the cut portions 14. The positions where the cut portions 14 and holes 15 are provided are in correspondence with the positions of hubs 8a of the cassette tapes 8 which are inserted in the receiving portions 9 as shown in FIG. 1 (b), for example, in pairs. And, the receiving portions 9 are open at the rear 16 of their lower portion and their bottom portion 17 as shown in FIG. 2 (b) and (c).

Reference numeral 18 in FIG. 2 (b) denotes a first engagement portion, for example, a groove portion, extended in the direction orthogonal to the receiving direction of the cassette tape 8 indicated by the arrow 11, namely, in the direction perpendicular to the surface of the paper in which FIG. 2 (b) is drawn, and the same is disposed at the position out of the center portion 19 of the side face 13, namely, in the bottom portion 17 of the tape container 6 on the side toward the tape receiving opening 10. Denoted by 20 is a cut portion formed in the side face 13 slightly above the groove portion 18, 21 and 22 are protrusions formed on the rear portion of the tape container 6, in which the protrusion 22 is provided with a rack 23 disposed thereon, and underneath the protrusion 22 is provided a recess 24 formed in a "<" shape.

Returning to FIG. 1 (a) and (b), 25 is a second engagement portion formed on the bottom of the table 7, namely, a protruded portion with which the groove portion 18 of the tape container 6 movably engages, and the same is extended in parallel with the direction of mounting and demounting of the tape container 6 on and from the table 7 excepting for the center portion as shown in FIG. 1 (a). Denoted by 27, 28, 29 are controlling portions provided on the side portions of the table 7 and extended, for example, in parallel with the direction indicated by the arrow 26 for controlling movement of the tape container 6 mounted on the table 7. Underneath the protrusion 27 of the table 7, there is formed a "<" shaped recess 30, and the protrusion 21 of the tape container 6 is adapted to be inserted in this recess 30. The protrusion 22 of the tape container 6 is adapted to be placed on the protrusion 28 of the table 7, and this protrusion 28 of the table 7 is adapted to be put in the recess 24 of the tape container 6. And, the protrusion 29 of the table 7 is adapted to fit in the cut portion 20 of the tape container 6 and, further, the under side of the protrusion 29 is adapted to face the bottom portion 31 of the cut portion 20. By the described arrangements, movement of the tape container 6 in the direction to feed the cassette tape 8 as indicated by the arrow 32 in FIG. 1 (a) and up-and-down movement of the tape container 6 in the direction orthogonal to the direction to feed the cassette tape 8, or in the direction indicated by the arrow 33 in FIG. 1 (b) is controlled.

In FIG. 1 (a), 34 and 35 denote gears to engage the rack 23 on the protrusion 22 of the tape container 6, and these gears are arranged to partly pass through holes provided in a side portion 36 of the table 7, on which the protrusions 27 and 28 are provided, and to project toward the tape container 6. Reference numerals 37 and 38 denote worm gears to rotate in conjunction with the rotations of the gears 34 and 35, and 39 and 40 denote worms threaded in the same direction and in mesh with the worm gears 37 and 38. Reference numeral 41 denotes a shaft on which the worms 39 and 40 are mounted, 42 denotes a pulley provided at one end of the shaft 41, and 43 denotes a motor for rotating the pulley 42. The motor 43, pulley 42, shaft 41, worms 39 and 40, worm gear 37 and 38, and the gears 34 and 35 constitute tape container moving means for moving the tape container 6 in the direction indicated by the arrow 26.

Figure 3A:
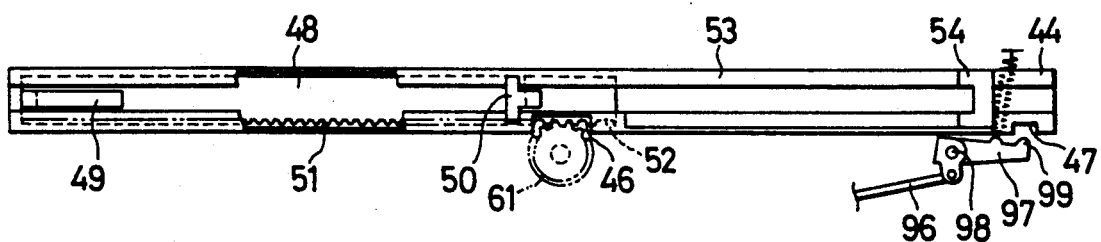
FIG. 3 (a) and (b) are drawings for explaining a rail and a slider provided in the preferred embodiment as shown in FIG. 1 (a) and (b), in which FIG. 3 (a) is a plan view and FIG. 3 (b) is a side view.
Figure 3B:
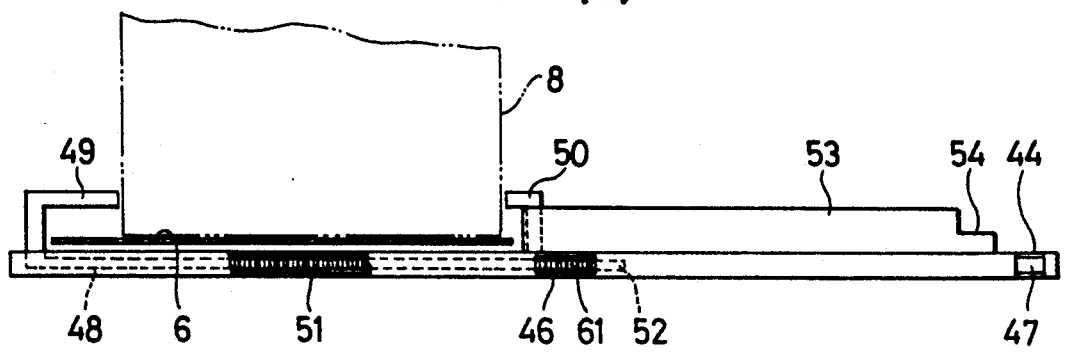
Figure 4A:
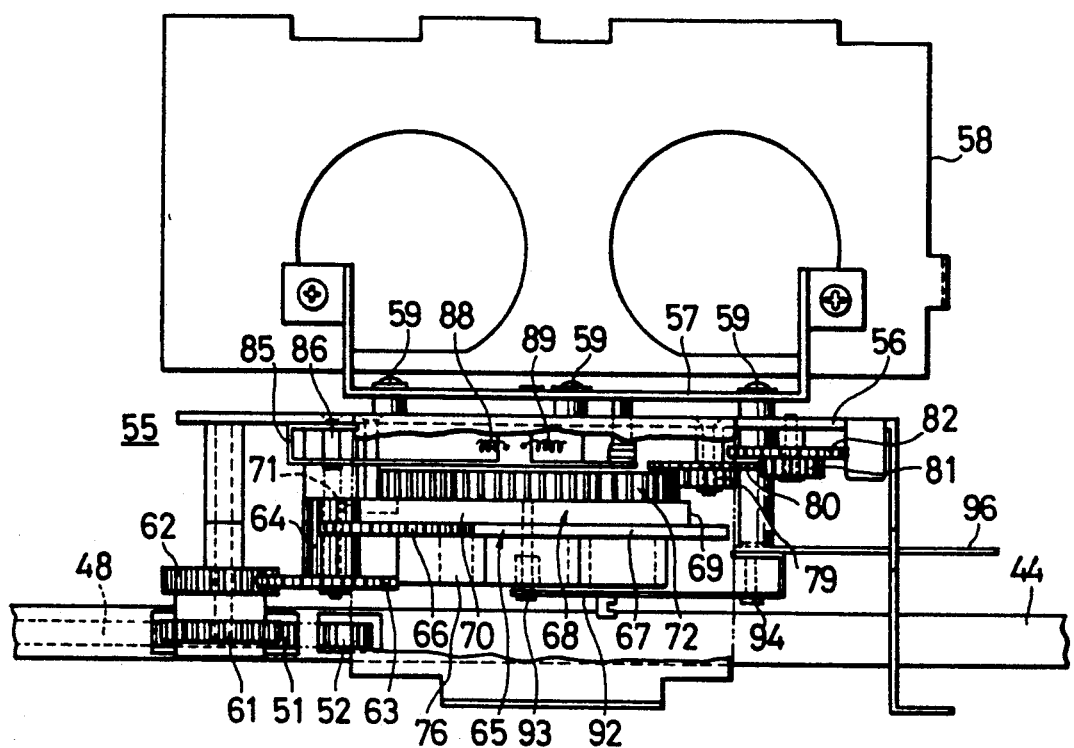
FIG. 4 (a), (b), (c), and (d) are drawings for explaining slider driving means provided in the preferred embodiment as shown in FIG. 1 (a) and (b), in which FIG. 4 (a) is a side view showing principal part, FIG. 4 (b) is a plan view for showing principal part, FIG. 4 (c) is a plan view for showing a gear portion, and FIG. 4 (d) is a rear view for showing a cam portion.
Figure 4B:
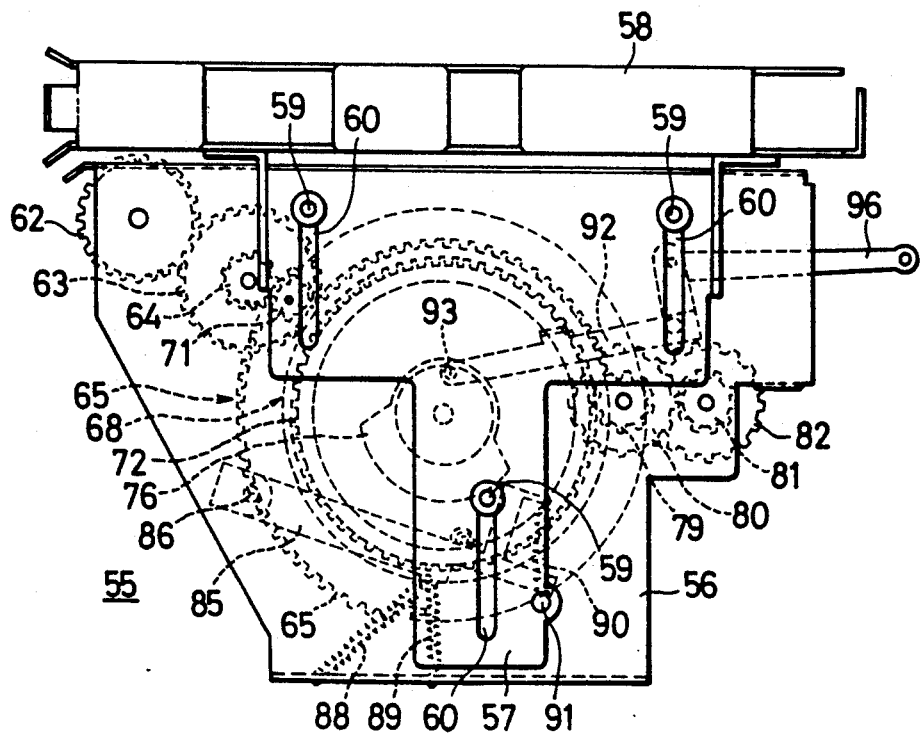
Figure 4C:
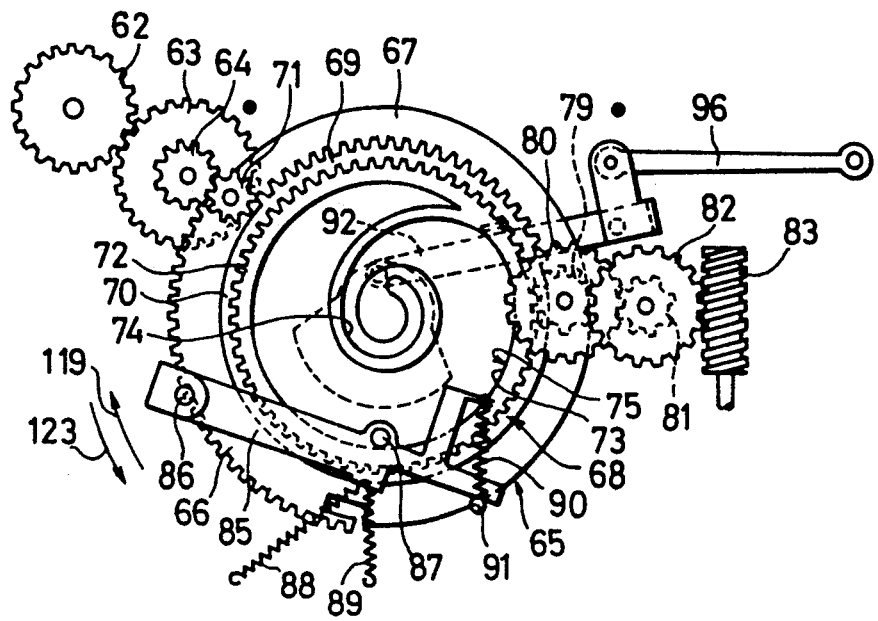
Figure 4D:
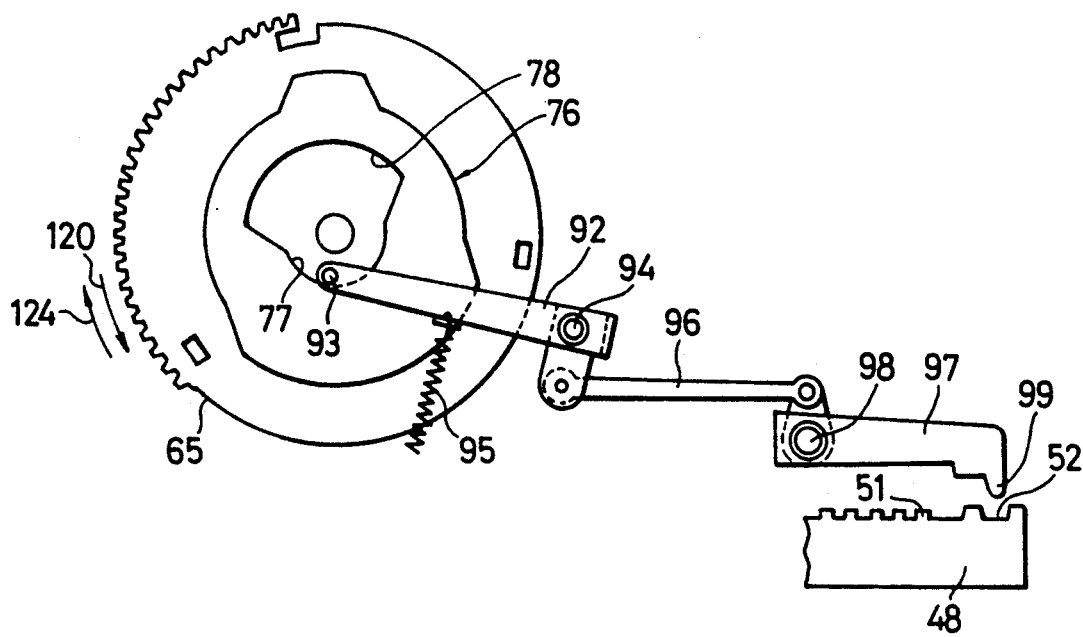

In FIG. 1 (a), 44 denotes a rail substantially in a "]" shape in its cross section disposed on the bottom plate 2 of the case 1 as is also shown in FIG. 3 (a) and (b). The rail 44 is extended from the position on the table 7 where the tape container 6 is disposed to where the cassette tape recorder 45 indicated by two-dot lines in FIG. 1 (a) is disposed and the same is provided with cut portions 46 and 47 in its side portion in the center of its length and at the end on the side of the cassette tape recorder 45, respectively. Denoted by 48 is a slider operably engaged with the rail 44 for sliding along the same. The slider 48 is provided thereon with protrusions 49 and 50 to engage a cassette tape 8 housed in the tape container 6 and also provided with a rack 51 on its side portion and a groove portion 52 at the end on the side of the cassette tape recorder 45. Denoted by 53 is a slider guide provided on the rail 44 on the side of the cassette tape recorder 45 for allowing the slider 48 to slide in a steady state and the same is provided at its end portion with a locking portion 54 to lock the protrusion 50 on the slider 48.

In FIG. 1 (a), 55 denotes slider driving means for driving the slider 48, structure of which will be described in the following.

The slider driving means 55 is disposed opposite to the cassette tape recorder 45 and includes a base plate 56 fixed on the bottom plate 2 of the case 1, a sliding plate 57 disposed above the base plate 56, and a frame member 58 provided on the sliding plate 57 integrally therewith and capable of receiving a cassette tape 8. The sliding plate 57 is provided therein with slits 60 in which pins 59 fixed on the base plate 56 are adapted to be loosely fitted. The slider driving means 55 further includes a gear 61 to engage the slider 48 as shown in FIG. 4 (a) and (b). Reference numeral 62 denotes a gear provided integrally with the gear 61, and these gears 61 and 62 are rotatably supported on the base plate 56. Reference numeral 63 denotes a gear put in mesh with the gear 62, and 64 denotes a small-diametered gear provided integrally with the gear 63, and these gears 63 and 64 are also rotatably supported on the base plate 56.

Numeral reference 65 is a first rotating member, which is provided on its periphery with a geared portion 66 to engage the gear 64 and nongeared portion 67 adjoining the geared portion 66 as shown in FIG. 4 (c). Denoted by 68 is a second rotating member provided on the first rotating member 65 integrally therewith, which is provided on its periphery with a geared portion 69 and a nongeared portion 70. Reference numeral 71 denotes an idle gear rotatably supported on the base plate 56 and disposed opposite to the periphery of the second rotating member 68 and the same is adapted to be engageable with the geared portion 69 of the second rotating member 68 while constantly engaged with the gear 64. Denoted by 72 is a gear provided on the second rotating member 68 integrally therewith and the same is provided therein with a cam 75 having a portion 73 far from the center of its rotation and a portion 74 coming gradually closer to the center as shown in FIG. 4 (c). And reference numeral 76 denotes a recessed cam provided under the first rotating member 65 integrally therewith and the same is formed of a portion 77 close to the center of its rotation and a portion 78 far from the center of its rotation as shown in FIG. 4 (d). The gear 72, second rotating member 68, first rotating member 65, and the cam 76 are all integrally formed and rotatably supported on the base plate 56.

Reference numeral 79 is a small-diametered gear put in mesh with the gear 72 and 80 is a large-diametered gear integrally provided with the gear 79 and the same is rotatably supported on the base plate 56. Denoted by 81 is a small-diametered gear put in mesh with the gear 80, and 82 is a large-diametered gear integrally provided with the gear 81 and the same is rotatably supported on the base plate 56. And, 83 denotes a worm put in mesh with the gear 82 and mounted on the output shaft of the motor 84 shown in FIG. 1 (a), and the motor 84 is fixed on the base plate 56.

Reference numeral 85 in FIG. 4 (a), (b), and (c) denotes a lever disposed above the gear 72. The lever 85 is adapted to rotate around the shaft 86 fixed to the base plate 56 and provided with a protrusion 87 disposed on its wider face portion which is adapted to engage the cam 75 on the gear 72. Denoted by 88 and 89 are springs each attached to the lever 85 at one end and attached to the base plate 56 at the other end for biasing the lever 85 so that its protrusion 87 will engage the cam 75. Reference numeral 90 is a spring attached to the lever 85 at one end and attached, at the other end, to a pin 91 fixed to the sliding plate 57 for causing the sliding plate 57 to cooperate with the lever 85.

Here, the cam 75, lever 85 provided with protrusion 87, springs 88, 89, and 90, sliding plate 57 provided with the pin 91, and the frame member 58 constitute cassette tape loading and unloading means for loading and unloading a cassette tape 8 into and from the cassette tape recorder 45.

Reference numeral 92 in FIG. 4 (d) is a lever disposed under the cam 76 and provided with a protrusion 93 at one end for engaging the cam 76 and the same is rotatably mounted on a shaft 94 fixed to the base plate 56. Denoted by 95 is a spring attached to the lever 92 at one end and to the base plate at the other end for biasing the lever 92 so that the protrusion 93 will engage the cam 76. Reference numeral 96 is a connecting rod, one end thereof is movably connected with the lever 92 for relative rotation therewith and 97 is a locking lever movably connected with the other end of the connecting rod 96 for relative rotation therewith, and the lever 97 is rotatably supported on a shaft 98 fixed to the base plate 2 of the case 1. The end portion 99 of the lock lever 97 is formed into a projected shape and the end portion 99 is adapted to be engageable with the groove portion 52 of the slider 48 as indicated by way of example in FIG. 4 (d).

Here, the cam 76, lever 92, spring 95, connecting rod 96, locking lever 97, and the shaft 98 constitute locking means for locking the slider 48 at the position where the cassette tape recorder 45 is disposed. Structure of the slider driving means 55 is as described in the foregoing.

Returning again to FIG. 1 (b), reference numeral 100 indicated by dotted lines denotes a door capable of opening and shutting the opening 5 provided in the side plate 4 of the case 1, which is provided therein with a hollow portion 101 extending in the opening and shutting direction of the door 100 between its top end portion and bottom end portion, for example, adjacent to its top end portion, and a rack 102 is provided, for example, on the upper edge portion of the hollow portion 101. Reference numeral 103 denotes a lower guide rail formed, for example, in a "]" shape in its cross section for slidably guiding the bottom end portion of the door 100, and 104 is an upper guide rail formed, for example, in a "]" shape in its cross section for slidably guiding the top end portion of the door 100, and these guide rails are fixed to the side plate 4. Denoted by 105 is a small-diametered gear to engage the rack 102 provided in the door 100, 106 is a large-diametered gear integrally formed with the gear 105, 107 is a small-diametered gear engaging the gear 106, 108 is a large-diametered gear integrally formed with the gear 107, 109 is a small-diametered gear engaging the gear 108, and 110 is a large-diametered gear integrally formed with the gear 109. Reference numeral 111 is a gear mounted on the output shaft of the motor 112 for engaging the gear 110. These gears 105 to 111 and the motor 112 are supported on a bracket 113 fixed on the rear side of the side plate 4. The gear 105 is mounted so as to be positioned within the hollow portion 101 provided in the door 100.

In FIG. 1 (a) and (b), 114 are hub locking members, for example, rod members, fixed at their bases to the side plate 3 of the case 1 and adapted to pass through the cut portions 14 and holes 15 of the tape container 6 and the hubs 8a of the cassette tape 8. The hub locking members 114 are provided in a pair in parallel with the mounting and demounting direction of the tape container 6 as indicated by the arrow 26 in FIG. 1 (a) and tapered at their end portions 115 as also indicated in FIG. (a) and (b) and, further, equipped with protrusion 11b for restraining rotation of the hub 8a of the tape cassette 8.

Operation of the preferred embodiment of the present invention structure as stated in the foregoing will be described in the following A. Operation for insertion of the tape container 6:

(Opening of the door 100)

When a drive signal from a control unit (not shown) is input to the motor 112 shown in FIG. 1 (a) and (b), the motor 112 is driven to rotate the gears 111, 110, 109, 108, 107, 106, and 105. By the rotation of the gear 105, the door 100 is caused to move, by means of the rack 102, in the direction to open the opening 5 in the side plate 4, whereby the opening 5 is fully opened and then the motor 112 is stopped. FIG. 1 (b) indicates the door 100 in a fully opened state.

(Mounting of the tape container 6 on the table 7)

Through the the opening 5 fully opened as above, the tape container 6 containing, for example, six cassette tapes 8 of different recorded contents received in respective receiving portions 9 thereof is inserted into the case 1 such that its groove portion 18 fits on the protruded portion 25 on the table 7, its cut portion 20 fits on the protrusion 29 on the table 7, its protrusion 21 fits in the recess 30 formed underneath the protrusion 27 on the table 7, its protrusion 22 is positioned over the protrusion 28 on the table 7, and the recess 24 formed underneath its protrusion 22 fits on the protrusion 28 on the table 7.

(Movement of the tape container 6)

At this time, a drive signal is output from the control unit (not shown) to drive the motor 43, and the rotating power of the motor 43 is transmitted through the pulley 42, shaft 41, worms 39 and 40, and the worm gears 37 and 38 to the gears 34 and 35 to keep these gears 34 and 35 in a rotating state.

Then, if the tape container 6 is pushed in until its rack 23 becomes engaged with the gear 35, the tape container 6 is caused by the rotation of the gear 35 to move in the direction indicated by the arrow 118 in FIG. 1 (a), when the rod members 114 are allowed to pass through the holes 15 of the tape container 6, the cut portions 14 in the partition walls 12, and the holes in the hubs 8a of all the cassette tapes 8. When, for example, the tape container 6 is brought to a predetermined stop position opposite to the side plate 3, the motor 43 is stopped and the tape container 6 is thereby stopped.

Figure 5A:
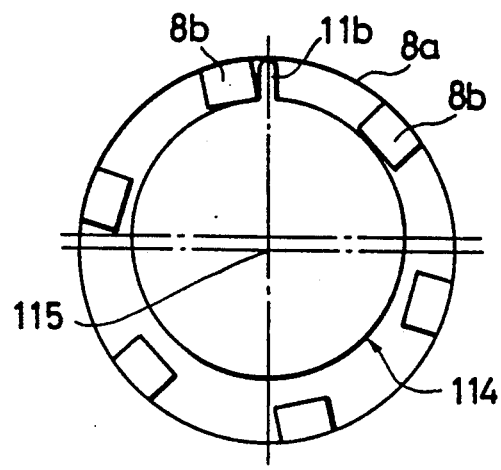
FIG. 5 (a) and (b) are drawings for showing relationship between a rod member provided in the preferred embodiment as shown in FIG. (a) and (b) and a hub, in which FIG. 5 (a) is a front view and FIG. 5 (b) is a side view.
Figure 5B:
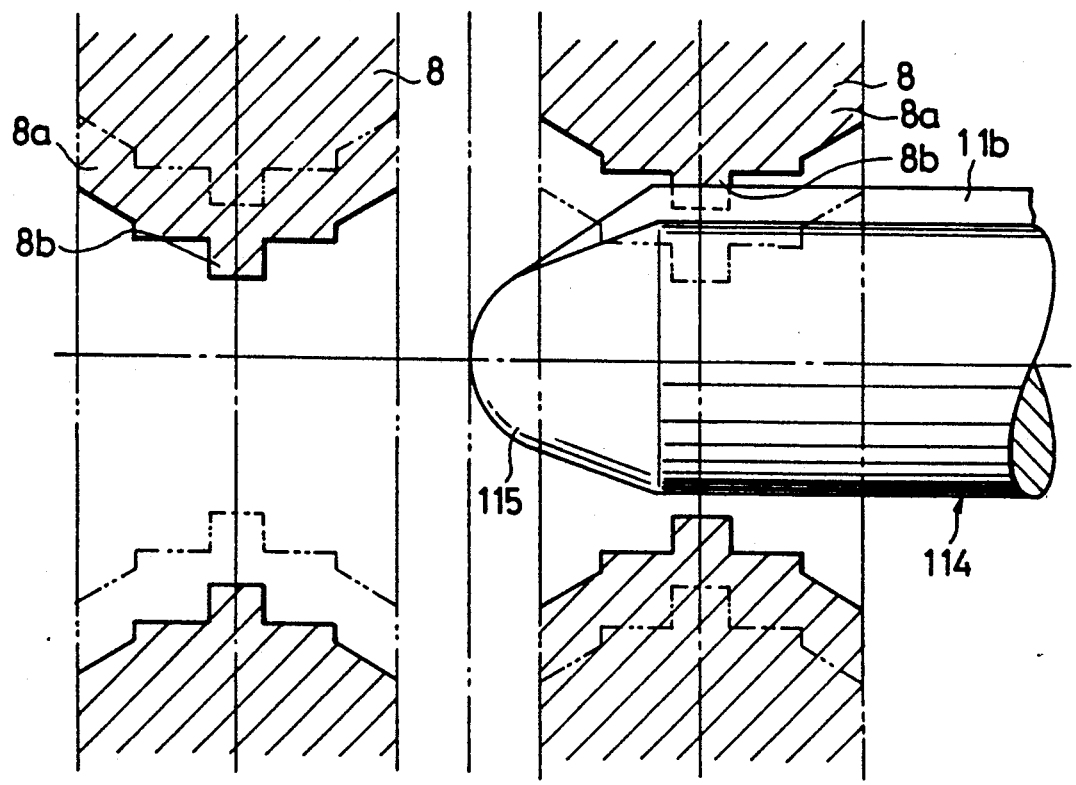

Incidentally, when the rod members 114 are inserted into the holes in the hubs 8a, the hubs 8a are slightly lifted by the rod members 114 guided by their end portions 115 as indicated in FIG. 5 (b), and so the weight of the hubs 8a including the weight of the tape becomes supported by the rod members 114.

(Closing of the door 100)

When, for example, the tape container 6 is brought to the predetermined position, namely, when the motor 43 is stopped, the motor 112 shown in FIG. 1 (a) and (b) is driven to cause the door 100 to shut the opening 5 in the side plate 4 and the motor 112 is stopped when the opening 5 is fully closed.

B. Operation for the playback (Feed of the tape cassette 8 to where the cassette tape recorder 45 is disposed)

When the tape container 6 is in the above mentioned state, that is, when the rod members 114 are passed through the tape container 6, the slider 48 is at a standby position as indicated in FIG. 3 (a) and (b).

At this time, the end of the geared portion 66 of the first rotating member 65 is engaged with the gear 64 and the idle gear 71 is opposing the end of the nongeared portion 70 of the second rotating member 68. And, the protrusion 87 of the lever 85 is engaged with the cam 75, which is provided on the gear 72, at the portion 73 far from the center of its rotation, whereby the sliding plate 57 is held at a position away from the cassette tape recorder 45 and the frame member 58 is held at the position above the rail 44. And, the protrusion 93 of the lever 92 is engaged with the cam 76, which is provided under the first rotating member 65, at the position 77 close to the center of the rotation of the cam 76, whereby the locking lever 97 is held via the connecting rod 96 such that the end portion 99 thereof is kept away from the cut portion 47 provided in the rail 44 as shown in FIG. 3 (a), etc.

(Movement of the tape container 6)

Under these conditions, if a specific cassette tape 8 is selected by selector means (not shown), a signal corresponding to the position of the selected cassette tape 8 is provided by the control unit (not shown) for the motor 43 to rotate, whereby the gears 34 and 35 are rotated to transfer the tape container 6 until the selected cassette tape 8 is positioned on the slider 48. At this time, the selected cassette tape 8 is arranged to be put between the protrusions 49 and 50 on the slider 48 as shown in FIG. 3 (b), and the rod members 114 are removed from the hubs 8a of the selected cassette tape 8.

(Feed of the cassette tape 8 to where the cassette tape recorder 45 is disposed)

Then, a signal from the control unit (not shown) is input to the motor 84 to rotate the same and the gears 82, 81, 80, and 79 shown in FIG. 4 (a), (b) and (c) are rotated by means of the worm 83. As a result, the gear 72, second rotating member 68, and the first rotating member 65 are rotated clockwise as indicated by the arrow 119 in FIG. 4 (c), and the cam 76, whose rear side is shown in FIG. 4 (d), is rotated in the direction indicated by the arrow 120 in the drawing.

In conjunction with the above said rotation of the gear 72 in the direction indicated by the arrow 119, the gears 64 and 63 in engagement with the geared portion 66 of the first rotating member 65 are rotated anticlockwise and the gears 62 and 61 are rotated clockwise, whereby the slider 48 is allowed by means of the rack 51 in engagement with the gear 61 to slide in the direction indicated by the arrow 121 in FIG. 1 (a). At this time, the rear 16 of the lower portion and the bottom 17 of the receiving portions 9 of the tape container 6 are open, the protrusion 49 of the slider 48 is not caught by the tape container 6 in transferring the cassette tape 8. And the cassette tape 8 is housed in the frame member 58 as the slider 48 is transferred in the direction indicated by the arrow 121.

In the mean time, the protrusion 87 of the lever 85 shown in FIG. 4 (c) is held engaged with the cam 75 at its portion 73 far from the center of its rotation, the idle gear 71 is still facing the nongeared portion 70 of the second rotating member 68, and the protrusion 93 of the lever 92 shown in FIG. 4 (d) is held as engaged with the cam 76 at the portion 77 close to the center of its rotation.

(Lock of the slider 48)

When the protrusion 93 shown in FIG. 4 (d) is brought in engagement with the portion 78 of the cam 76 far from the center of its rotation, the lever 92 is thereby rotated anticlockwise on FIG. 4 (d), the locking lever 97 is rotated via the connecting rod 96 clockwise on FIG. 4 (d), namely, anticlockwise on FIG. 3 (a), and the end 99 of the lever 97 is caused to enter the cut portion 47 provided in the rail 44 and put in engagement with the groove 52 provided in the slider 48 so that the slider 48 is locked thereto and becomes unmovable.

Meanwhile, the gear 64 is positioned to face the nongeared portion 67 of the first rotating member 65, that is, the gear 64 is disengaged from the geared portion 66 of the first rotating member 65.

(Loading of the cassette tape 8 into the cassette tape recorder 45)

With the slider 48 locked as above, as the gear 72 is still rotated in the direction indicated by the arrow 119 with the continued rotation of the motor 84 in the same direction, the protrusion 87 of the lever 85 becomes engaged with the cam 75 at its position 74 close to the center of its rotation past the portion 73 far from there, whereby the lever 85 is rotated anticlockwise on FIG. 4 (c) and the sliding plate 57, and the frame member 58 holding the cassette tape 8, is allowed, through the spring 90 and pin 91, to move in the direction toward the cassette tape recorder 45 to load the cassette tape 8 into the cassette tape recorder 45.

(Return of the slider 48 after the cassette tape 8 has been loaded into the recorder 45)

Under these conditions, as the motor 84 continues to rotate in the same direction and the gear 72 is kept on rotating in the direction indicated by the arrow 119 in FIG. 4 (c), the cam 76 is rotated in the direction indicated by the arrow 120 in FIG. 4 (d) and the protrusion 93 of the lever 92 becomes engaged with the cam 76 again at the portion 77 close the center of its rotation, whereby the locking lever 97 is disengaged from the slider 48 to render the slider 48 movable. And the idle gear 71 becomes engaged with the geared portion 69 of the second rotating member 68. As the second rotating member 68 rotates in the direction indicated by the arrow 119, the idle gear 71 rotates anticlockwise on FIG. 4 (c) to rotate the gear 64 clockwise and thereby to rotate, via the gear 63, the gear 62, hence the gear 61 in engagement with the rack 51 of the slider 48, anticlockwise, whereby the slider 48 is returned in the direction indicated by the arrow 122 in FIG. 1 (a) toward the tape container 6. The motor 84 stops when the slider 48 has been housed back in the tape container.

In the mean time, the protrusion 87 of the lever 85 on the gear 72 is held as engaged with the cam 75 at the portion 74 close to the center of the rotation of the cam 75, and therefore, the sliding plate 57 and the frame member 58 are kept in the position approaching the cassette tape recorder 45 and the cassette tape 8 is retained in the position to enable the cassette tape recorder 45 to make the playback operation.

(Movement of the tape container 6)

When the slider 48 is returned within the tape container 6 as stated above, the motor 43 shown in FIG. 1 (a) is driven by a signal from the control unit (not shown) to rotate the gears 34 and 35, whereby the tape container 6 is transferred to the predetermined position adjacent to the side plate 3 and then the motor 43 is stopped. At this time, the rod members 114 are passed through all of the hubs 8a of the remaining cassette tapes 8 housed in the tape container 6.

In these circumstances, the desired playback operation is made by the cassette tape recorder 45 upon receipt of a drive signal from the control unit (not shown).

C. Operations after the playback (Movement of the tape container 6)

When the playback of the cassette tape 8 has been finished, the motor 43 is driven by a drive signal from the control unit (not shown) to rotate the gears 34 and 35 clockwise, whereby the tape container 6 is transferred until the receiving portion 9 in which the cassette tape 8 loaded into the cassette tape recorder 45 was received comes over the slider 48, and then the motor 43 is stopped.

(Feed of the slider 48 to where the cassette tape recorder 45 is disposed)

Responding to a drive signal from the control unit (not shown), the motor 84 rotates in the direction reverse to that at the time of the above described playback operation, whereby the gear 72, second rotating member 68, and the first rotating member 65 are rotated anticlockwise as shown by the arrow 123 in FIG. 4 (c) and the cam 76 whose rear side is shown in FIG. 4 (d) is rotated in the direction as indicated by the arrow 124 in the drawing.

As the gear 72 rotates in the direction as indicated by the arrow 123, the idle gear 71 in engagement with the geared portion 69 of the second rotating member 68 rotates clockwise, the gears 64 and 63 rotated anticlockwise, and the gears 62 and 61 rotate clockwise, whereby the slider 48 is allowed by means of the rack 51 to slide in the direction indicated by the arrow 121 in FIG. 1 (a) and the slider 48 reaches the end position where the same faces the cassette tape recorder 5.

(Lock of the slider 48)

In the meantime, the protrusion 87 of the lever 85 shown in FIG. 4 (c) is engaged with the cam 75 at its portion 74 close to the center of its rotation, and therefore the sliding plate 57 and the frame member 58 are held at the position approaching the cassette tape recorder 45 and the cassette tape 8 is held as loaded in the cassette tape recorder 45, and the protrusion 93 of the lever 92 shown in FIG. 4 (d) is transferred from the engagement with the portion 77 close to the center of the rotation of the cam 76 to the engagement with the portion 78 far from the center of the rotation, and so the locking lever 97 is rotated, through the connecting rod 96, to rotate clockwise on FIG. 4 (d), namely, anticlockwise on FIG. 1 (a), whereby the locking lever 97 is engaged at its end portion 99 with the groove portion 52 provided in the slider 48 and the slider 48 is thus locked. At this time, the idle gear 71 is positioned to face the nongeared portion 70 of the second rotating member 68, that is, the idle gear 71 is disengaged from the geared portion 69 of the second rotating member 68.

(Unloading of the cassette tape 8 from the cassette tape recorder 45)

While the slider 48 is locked as state above, the gear 72 continues to rotate in the direction as indicated by the arrow 123 with the continued rotation of the motor 84 in the same direction and the protrusion 87 of the lever 85 becomes engaged with the cam 75 at its portion 73 far from the center of its rotation past the portion 74 close to the center of the rotation, whereby the lever 85 is rotated clockwise on FIG. 4 (c) and the sliding plate 57 and the frame member 58 are transferred in the direction away from the cassette tape recorder 45 to position the cassette tape 8 on the slider 48. In the meantime, the geared portion 66 of the first rotating member 65 is brought to the position opposite to the gear 64.

(Return of the cassette tape 8 and slider 48)

Thereafter, as the motor 84 is still rotated and the gear 72 is continued to be rotated in the direction indicated by the arrow 123 in FIG. 4 (c), the cam 76 is thereby rotated in the direction indicated by the arrow 124 in FIG. 4 (d) and the protrusion 93 of the lever 92 is again brought in engagement with the portion 77 of the cam 76 close to the center of its rotation, whereby the locking lever 97 is disengaged from the slider 48 and the slider 48 is thus rendered movable. And, the geared portion 66 of the first rotating member 65 is put in engagement with the gear 64, and with the rotation of the first rotating member 65 in the direction indicated by the arrow 123, the gears 64 and 63 are rotated clockwise and the gears 62 and 61 rotated anticlockwise, whereby the slider 48 and the tape cassette 8 pushed by the protrusion 50 on the slider 48 are returned in the direction indicated by the arrow 122 in FIG. 1 (a) until the same reach the receiving portion 9 corresponding thereto within the tape container 6. The motor 84 is stopped at the point when the slider 48 and the tape cassette 8 are returned within the tape container 6.

(Movement of the tape container 6)

When the slider 48 and the cassette tape 8 are returned within the tape container 6 as described above, the motor 43 shown in FIG. 1 (a) is driven upon receipt of a drive signal from the control unit (not shown) to rotate the gears 34 and 35, whereby the tape container 6 is transferred to the predetermined position adjacent to the slide plate 3 and then the motor 43 is stopped.

Thus the apparatus is put in a stand-by state waiting for the next playback operation.

In the embodiment of the above described structure, the movement of the cassette tape 8 within the case 1 is supported by means of the tape container 6 which is strongly built and capable of containing six cassette tapes 8, and so the cassette tape 8 is free from vibration given to the case 1 and loaded into the cassette tape recorder 45 to provide a good playback operation.

Since a groove portion 18 is provided in the tape container 6, a protruded portion 25 is provided on the table 7, and the grooved portion 18 is provided in the side plates 3 and 4 of the tape recorder 6 at the position out of the center, it is adapted such that the tape container 6 cannot be inserted into the table 7 unless it is held in the correct position and an erred insertion of the tape container 6 into the table 7 is thus prevented.

Since there are provided the cut portions 14 and holes 15 in the tape container 6 at the position to correspond to the hubs 8a of the cassette tape 8 and the rod members 114 capable of passing through the cut portions 14, holes 15, and the hubs 8a, the cassette tapes 8 contained in the tape container 6 can be held free from loosening if vibration is given from the outside.

Especially because the combinations of the cut portions 14 and the holes 15 with the rod members 114 are provided in pairs, rotation of the hubs 8a of the cassette tape 8 can be restrained and the cassette tapes 8 contained in the tape container 6 are held in a good condition and never get loosened.

Since the end portion 115 of the rod member 114 is tapered, the rod member 114 when inserted into the hole in the hub 8a of the cassette tape 8 is enabled to smoothly pass through the hole.

And, since there are provided a rail 44, slider 48 having the protrusions 49 and 50 with which the cassette tape 8 is engageable, and slider driving means 55 for driving the slider 48, the cassette tape 8 can be loaded into the cassette tape recorder 45 without being adversely affected by an external vibration given to the cassette tape 8 and a good playback operation can thereby be achieved.

Since the slider driving means 55 is provided with means for loading and unloading the cassette tape 8 into and from the cassette tape recorder 45, and since the means for loading and unloading the cassette tape 8 is formed of a frame member 58, lever 85, and a cam mechanism including a cam 75, the structure is made simple and setting and removal of the cassette tape 8 can be performed satisfactorily.

Further, since the slider driving means 55 is provided with the locking means for locking the slider 48 to the position where the cassette tape recorder 45 is disposed, and since the locking means is formed of the locking lever 97, lever 92, connecting rod 96, and the cam mechanism including the cam 76 and so on, the structure is made simple and not adversely affected by the external vibration if any, and thus the setting and removing operations of the cassette tape 8 are facilitated.

Since the table 7 is provided with protrusions 27, 28, and 29, which are adapted to engage the protrusions 21 and 22, and the bottom portion 31 of the cut portion 20 of the tape container 6, respectively, movement of the tape container 6 in the direction in which the cassette tape 8 is fed, or the direction indicated by the arrow 32 in FIG. 1 (a), and up-and-down movement of the tape container 6 in the direction orthogonal to that indicated by the arrow 32, or the direction indicated by the arrow 33 in FIG. 1 (b), are both restrained thereby producing no plays due to vibration.

Since there are provided a door 100 for opening and abutting the opening 5 provided in the side plate 4 through which the tape container 6 is inserted and the door driving means including the motor 112 to slide the door 100, the interior of the case 1 where the tape container 6 is housed can be maintained in an enclosed state not allowing foreign objects to enter and the need for manually opening and shutting the door 100 is eliminated, and thus the tape container 6 can be easily mounted on the table 7.

Since it is arranged such that the rack 102 provided in the upper edge portion of the hollow portion 101 formed in the door 100 will be engaged with the gear 105 to which the rotating power of the motor 112 is transmitted, and the gear 105 is adapted to be contained in the hollow portion 101, the installation height of the door driving means including the guide rails 103 and 104 can be minimized and this contributes to miniaturization of the case 1.

In the above described embodiment, the tape container 6 is provided with the first engagement portion formed of the groove portion 18 and the table 7 is provided with the second engagement portion formed of the protruded portion 25, but the present invention is not limited by such arrangement. That is, the first engagement portion can be formed of a protruded portion and the second engagement portion can be formed of a groove portion operably engaged with the protruded portion for relative movement.

Although, in the above described embodiment, the groove portion 18 as the first engagement portion is provided in the bottom portion 17 of the tape container 6 at the end on the side of the opening 10 for receiving the cassette tape 8, the present invention is not limited by such arrangement. That is, the first engagement portion to be provided for the tape container 6 can be formed on the tape container 6 at its upper portion between the center portion 19 and the receiving opening 10 shown in FIG. 2 (b), or, in other words, it can be provided anywhere out of the center portion 19 and not interfering with the movement of the slider 48 and the cassette tape 8.

In the above described embodiment, the rod members 114 are used as hub locking members for restraining the rotation of the hubs 8a of the cassette tapes 8 contained in the tape container 6, but the present invention is not limited by the use of the rod members 114. That is, the locking members can be formed of flat plate members or the like. While the hub locking members are provided in a pair corresponding to the hubs 8a on both sides of the cassette tape 8, the same can be of single member provided for either of the two hubs 8a.

While, in the above described embodiment, the slider driving means 55 is constituted of the first rotating member 65 having the geared portion 66 and nongeared portion 67 and the second rotating member 68 having the geared portion 69 and nongeared portion 70, the slider driving means 55 can be designed differently in various ways.

Although, in the above described embodiment, protrusions 27, 28, and 29 are provided on the table 7 as the controlling members for controlling movement of the tape container 6 in the direction indicated by the arrow 32 in FIG. 1 (a) and in the direction indicated by the arrow 33 in FIG. 1 (b), the present invention is not limited by such arrangement. That is, the controlling members can be formed by groove portions depending upon the external shape of the tape container 6.

And, though, in the above described embodiment, the opening 5 is arranged to be opened and shut by sliding the door 100, the present invention is not limited by such arrangement. That is, the opening 5 can be opened and shut by a door 100 of a rotational type.

According to the automatic changer for cassette tapes of the present invention described in the foregoing, since the movement of the cassette tape in the apparatus is arranged to be supported by the movement of the strongly built tape container capable of containing a plurality of cassette tapes, the apparatus is prevented from being adversely affected by external vibration to be given to the case and thereby enabled to perform satisfactory recording and playing back operation, and therefore, the same is well suited for the use in a car.

Since the tape container is provided with the first engagement portion and the table is provided with the second engagement portion which engages the first engagement portion and the first engagement portion is disposed on the tape container out of the center portion thereof, the tape container is prevented from being wrongly inserted into the table.

Since the holes are provided in the side plates of the tape container at the positions corresponding to the hubs of the cassette tape, the cut portions are provided in the partition walls for forming the tape receiving portions within the tape container, and the hub locking members capable of passing through the holes, cut portions, and hubs and controlling the rotation of the hub are provided, the tapes contained in the tape container are prevented from loosening.

Since the rail, the slider with which the cassette tape is engageable, and the slider driving means for driving the slider are provided, the cassette tape is prevented from being adversely affected by the vibration given thereto and satisfactorily loaded into the cassette tape recorder and thus enables the apparatus to provide good recording and playing back operation.

Since the table is provided with the controlling members for controlling the movement of the tape container in the direction in which the cassette tape is fed and in the direction orthogonal to the direction of the feed, a play due to vibration can be prevented.

And, since there are provided a door capable of opening and shutting the opening through which the tape container is inserted into the case and the door driving means for opening and closing the door, the interior of the body can be enclosed so that no foreign objects are admitted therein. Also by such arrangement, the door is opened and shut without the need for manual operation and the mounting of the tape container into the body can be easily carried out.

What is claimed is:

1. An automatic cassette tape changer comprising:
    a tape container for containing a plurality of cassette tapes;
    a rail extending from a first location adjacent said tape container to a second location adjacent to a cassette tape recorder;
    a slider slidably engaged with said rail, said slider having protrusions adapted to be engaged with any one of said cassette tapes contained in said tape container; and
    a slider driving means for driving said slider along said rail, said slider driving means including
    a rotating member provided with a geared portion and a nongeared portion on its periphery and
    an idle gear disposed opposite to said rotating member, said idle gear being adapted to oppose said nongeared portion on said rotating member when a cassette tape is fed to said tape recorder by said slider moving from said first location to said second location, and said idle gear is disposed to engage said geared portion on said rotating member after said cassette tape has been loaded into said cassette tape recorder whereupon said slider is returned from said second location to said first location, and said rotating member being adapted to rotate only in one predetermined direction while said cassette is fed to said tape recorder and then said slider is returned from said second location to said first location after said tape cassette has been loaded.

2. An automatic cassette tape changer comprising:
    a rail having a first end and a second end, wherein said first end is adjacent to a location where a cassette tape container may be disposed and said second end is adjacent to a cassette tape recorder;
    a slider slidably engaged with said rail, said slider having protrusions for engaging a cassette tape disposed in such a cassette tape container; and
    a slider driving means for driving said slider along said rail, said slider driving means including
    a first rotatable member having an axis of rotation, said first rotatable member including a geared portion providing gear teeth along a first surface of said first rotatable member at a first predetermined diameter from said axis of rotation; and
    said first rotatable member including a nongeared portion along a second surface of said first rotatable member such that a second rotatable member disposed at a fixed location having gear teeth which mesh with said geared portion when opposite said gear portion, do not contact said nongeared portion when opposite said nongeared portion; and a rotatable idle gear disposed opposite to said first rotatable member, said idle gear being disposed such that it is opposite said nongeared portion on said first rotatable member when said slider is driven from said first end of said rail to said second end of said rail during a first portion of a cassette loading stroke and such that it is opposite to and engaged with said geared portion on said first rotatable member when said slider is driven from said second end of said rail to said first end of said rail during a second portion of said cassette loading stroke, and wherein said first rotatable member rotates in only one predetermined direction during said first and second portions of said cassette loading stroke.

3. An automatic cassette tape changer according to claim 2, wherein said rotatable idle gear is disposed such that it is opposite to and engaged with said geared portion on said rotatable member when said slider is driven from said first end of said rail to said second end of said rail during a first portion of a cassette unloading stroke and such that it is opposite said nongeared portion on said first rotatable member when said slider is driven from said second end of said rail to said first end of said rail during a second portion of said cassette unloading stroke, and wherein said first rotatable member rotates in a direction opposite said one predetermined direction during said first and second portions of said cassette unloading stroke.

* * * * *

UNITED STATES PATENT AND TRADEMARK OFFICE
CERTIFICATE OF CORRECTION

PATENT NO. : 5,031,057
DATED : July 9, 1991
INVENTOR(S) : Kikuchi et al.

It is certified that error appears in the above-indentified patent and that said Letters Patent is hereby corrected as shown below:

On the title page, item [73] should read as follows:

"Alpine Electronics, Inc., Japan"

Signed and Sealed this

Tenth Day of May, 1994

Attest:

BRUCE LEHMAN

Attesting Officer

Commissioner of Patents and Trademarks